(12) United States Patent
Dantwala (10) Patent No.: US 6,760,376 B1
(45) Date of Patent: Jul. 6, 2004

(54) MOTION COMPENSATED UPCONVERSION FOR VIDEO SCAN RATE CONVERSION

(75) Inventor: Nehal R. Dantwala, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 697 days.

(21) Appl. No.: 09/706,671

(22) Filed: Nov. 6, 2000

(51) Int. Cl.$^7$ .............................................. H04N 7/12
(52) U.S. Cl. ............................. 375/240.06; 375/240.07
(58) Field of Search ................................ 348/452, 699, 348/700, 448; 375/240.17, 240.25, 240.16, 240.06, 240.07; 382/236

(56) References Cited

U.S. PATENT DOCUMENTS

| 5,036,393 | A | * | 7/1991 | Samad et al. ................ 348/452 |
| 5,504,531 | A | * | 4/1996 | Knee et al. .................. 348/452 |
| 6,385,245 | B1 | * | 5/2002 | De Haan et al. ......... 375/240.16 |
| 6,553,072 | B1 | * | 4/2003 | Chiang et al. .......... 375/240.25 |

FOREIGN PATENT DOCUMENTS

| EP | 0535066 B1 | 4/1993 |
| GB | 2279531 A | 1/1995 |
| WO | 9922520 A2 | 5/1999 |

OTHER PUBLICATIONS

Driessen et al, A Pel–Recursive Segmentation and estimation algorithm for motion compensated image sequence coding, 1989, CH2673–2/89/0000–1901, pp. 1901–1904.*

Weinstein et al., "An Information–Intensive Approach to the Molecular Pharmacology of Cancer," Science vol. 275, pp. 343–349 (Jan. 17, 1997).

* cited by examiner

Primary Examiner—Chris Kelley
Assistant Examiner—Erick Rekstad
(74) Attorney, Agent, or Firm—Laurie E. Gathman (57) ABSTRACT

For use in a video image upconversion unit of the type that uses motion compensation to generate an interpolated field using motion vectors, an improved method of motion compensation is disclosed that calculates a first correlation value from the values of corresponding neighbor pixels of a previous frame and from the values of causal neighbor pixels of a generated field. The first correlation value is compared with a first threshold value. The value of a pixel to be created within the generated field is set to be equal to the value of a corresponding pixel of the previous frame if the first correlation value is less than the first threshold value. The method also calculates a second correlation value from the values of corresponding neighbor pixels of a next field and from the values of causal neighbor pixels of a generated field. The second correlation value is compared with a second threshold value. The value of a pixel to be created within the generated field is set to be equal to the value of a corresponding pixel of the next field if the second correlation value is less than the second threshold value.

33 Claims, 4 Drawing Sheets

MOTION COMPENSATED UPCONVERSION FOR VIDEO SCAN RATE CONVERSION

TECHNICAL FIELD OF THE INVENTION

The present invention comprises an improved method of motion compensated upconversion in a video image upconversion unit of the type that uses motion compensation to generate an interpolated video field using motion vectors. The improved method of the present invention selects a motion compensated pixel that will provide a sharp video image by comparing a calculated correlation value of pixels with a threshold value.

BACKGROUND OF THE INVENTION

A moving video image is transmitted by a video transmitter as a sequence of frames or pictures. Each frame or picture may be coded individually, but is displayed sequentially at a video rate. Each video frame is made up of two video fields, an odd video field and an even video field. More specifically, an individual frame denoted by the letter "A" is made up of an odd field denoted by the letters "Ao" and an even field denoted by the letters "Ae."

When capturing or recording a video sequence, either frames or fields may be captured. When both the odd field and the even field of a video frame are captured at the same time, the picture is said to be a "progressive" picture. The odd fields and the even fields are not generally used to describe progressive pictures. Instead the individual video frames (e.g., frame A, frame B) are used to describe progressive pictures. Most movie film material is composed of progressive pictures.

When the odd field and the even field of a video frame are captured at different times, the picture is said to be an "interlaced" picture. The two fields are not combined to be displayed at the same time. Each field is treated and displayed separately. Most television material is composed of interlaced pictures.

In order to achieve maximum efficiency during the transmission process, not every field or frame is transmitted. That is, some of the individual fields or frames are dropped and are not transmitted. The dropped fields or frames are recreated by the video receiver from information taken from the fields or frames that are transmitted.

For example, the dropped fields or frames can be recreated simply by repeating the previous field or frame. Alternatively, if the display is delayed, the next field or frame that follows the dropped field or frame can be used to take the place of the dropped field or frame. It is also possible to replace the dropped field or frame by averaging the neighboring fields or frames on each side of the dropped field or frame.

There are difficulties with these simple approaches. Repeating a previous field or frame (or using the next following field or frame) in place of the dropped field or frame causes the perceived image to be jerky even when small motions are depicted in the video image. Averaging the fields or frames causes the perceived image to be blurred even when moderate motions are depicted in the video image.

A well known method for recreating the dropped fields or frames is motion compensated interpolation. In motion compensated interpolation (also referred to as "bidirectional prediction") a subsignal with a low temporal resolution (typically one half to one third of the frame rate) is coded and the full resolution signal is obtained by interpolation of the low resolution signal and the addition of a correction term. The signal to be reconstructed by interpolation is obtained by adding a correction term to a combination of a past and a future reference.

Video sequences exist in various formats. For example, high definition (HD) television video sequences may be displayed in any one of eighteen (18) different formats. The process of converting a video sequence from one format to another format is called "scan rate conversion."

Scan rate conversion may be used to reduce image flicker in televison images. For example, a European televison video standard specifies a frequency of fifty Hertz (50 Hz). That is, the video fields are to be displayed at a rate of fifty fields per second. This televison video rate is not sufficient to prevent noticeable flicker in the television image. To reduce image flicker, the television video rate may be increased to one hundred Hertz (100 Hz) by interpolating additional fields between the original fields in the video image.

Scan rate conversion techniques may be used to convert twenty four Hertz (24 Hz) film to sixty Hertz (60 Hz) video images. Scan rate conversion techniques may also be used to convert thirty Hertz (30 Hz) high definition (HD) camera images to sixty Hertz (60 Hz) video images.

The additional fields needed for scan rate conversion may be acquired by simply repeating the original fields. The preferred method, however, is to use a progressive to interlace conversion using motion compensated interpolation.

There is a need in the art for an improved method of motion compensation to generate interpolated fields that will provide a sharp video image. In particular, there is a need in the art for an improved method of selecting one of two possible choices of a motion compensated pixel for inclusion in a generated field to be interpolated between a previous frame and a next field. There is also a need in the art for an improved method of determining whether the inclusion of the pixel from the previous frame or the inclusion of the pixel from the next field will provide a sharper video image in the generated field.

SUMMARY OF THE INVENTION

The present invention comprises an improved method of motion compensation that selects one of two possible choices of a motion compensated pixel for inclusion in a generated field to be interpolated between a previous frame and a next field.

The improved method of the invention comprises the steps of (1) calculating a first correlation value from the values of causal neighbor pixels of a generated field and from the values of corresponding neighbor pixels of a previous frame, (2) comparing the first correlation value with a first threshold value, and (3) setting the value of the pixel to be created within the generated field to be equal to the value of a corresponding pixel of the previous frame if the first correlation value is less than the first threshold value.

The improved method of the invention also comprises the steps of (1) calculating a second correlation value from the values of causal neighbor pixels of a generated field and from the values of corresponding neighbor pixels of a next field, (2) comparing the second correlation value with a second threshold value, and (3) setting the value of the pixel to be created within the generated field to be equal to the value of a corresponding pixel of the next field if the second correlation value is less than the second threshold value.

It is a primary object of the present invention to provide an improved method motion compensated upconversion in a video image upconversion unit of the type that uses motion compensation to generate an interpolated video field using motion vectors.

It is an additional object of the present invention to provide a method for selecting one of two possible choices of a motion compensated pixel for inclusion in a generated field to be interpolated between a previous frame and a next field.

It is another object of the present invention to provide an improved method for selecting a motion compensated pixel that will provide a sharp video image by comparing a calculated correlation value of pixels with a threshold value.

It is also an object of the present invention to provide an improved method for calculating a correlation value of pixels to be used to select a motion compensated pixel that will provide a sharp video image in a generated field to be interpolated between a previous frame and a next field.

It is an additional object of the present invention to provide an improved method for determining a threshold value to be used to select a motion compensated pixel that will provide a sharp video image in a generated field to be interpolated between a previous frame and a next field.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments set forth in this patent document to describe the principles of the present invention are by way of illustration only and should not be construed in any way to limit the scope of the invention. In the descriptions of the advantageous embodiments that follow, the improved method of the present invention is used in connection with a high definition (HD) progressive to interlace converter.

The present invention comprises an improved method of motion compensation that selects an appropriate motion compensated pixel based upon the comparison of calculated correlation values of neighboring pixels with predetermined threshold values. It is important to realize that the method of the present invention is not limited to use in an HD progressive to interlace converter. Those skilled in the art will readily understand that the principles of the present invention may also be successfully applied in any type of electronic equipment that applies motion compensation techniques to video signals. In the descriptions that follow, the HD progressive to interlace converter is described as an example of an item of equipment in which the improved method of the present invention may be employed.

Figure 1:
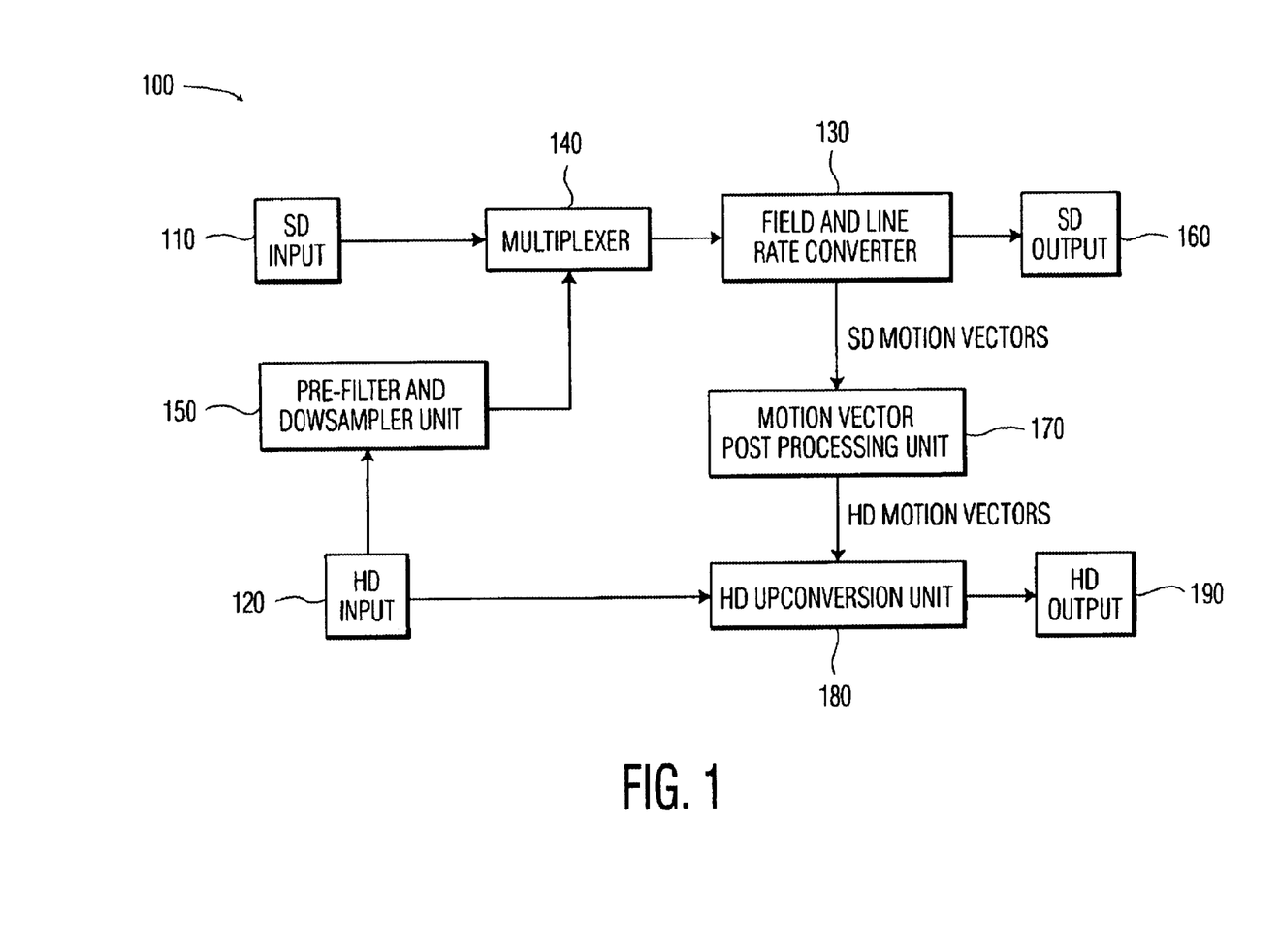
FIG. 1 is a block diagram of an exemplary high definition (HD) progressive to interlace converter that utilizes the improved method of the present invention.

FIG. 1 illustrates high definition (HD) progressive to interlace converter 100. HD progressive to interlace converter 100 receives standard definition (SD) video signals from SD input 110 and receives HD video signals from HD input 120. As will be explained below in greater detail, HD progressive to interlace converter 100 converts progressive HD material to interlaced format using motion compensation techniques.

HD progressive to interlace converter 100 comprises field and line rate converter 130. Field and line rate converter 130 comprises an SAA4992 integrated circuit (sometimes referred to as FALCONIC for "field and line rate converter integrated circuit"). The SAA49942 integrated circuit is sold commercially by Philips Electronics North America Corporation. Field and line rate converter 130 is capable of performing scan rate conversions for SD size video images.

As shown in FIG. 1, field and line rate converter 130 receives SD video signals from SD input 110 via multiplexer 140. If the input to HD progressive to interlace converter 100 is an SD input, the SD video images simply pass through multiplexer 140 directly to field and line rate converter 130. The SD video images are then output to SD output 160.

HD progressive to interlace converter 100 receives HD video signals from HD input 120. If the input to HD progressive to interlace converter 100 is an HD input, the HD video images must be pre-filtered and downsampled to SD size. This is accomplished in pre-filter and downsampler unit 150. The SD video images from pre-filter and downsampler unit 150 are then sent to multiplexer 140 and passed on to field and line rate converter 130.

The filter (not shown) in pre-filter and downsampler unit 150 is a conventional low pass filter used to satisfy the Nyquist criteria. The filter may comprise an eleven tap filter that uses the following filter taps: (1) 0.015625 (2) 0 (3) −0.0703125 (4) 0 (5) 0.3046875 (6) 0.5 (7) 0.3046875 (8) 0 (9) −0.0703125 (10) 0 and (11) 0.015625.

After the HD video images are filtered, they are downsampled by a factor of one or two or three based on the following conditions. The downsample factor is set equal to three (1) if the number of pixels per line is greater than 1440 and less than or equal to 2160, or (2) if the number of lines per frame is greater than 1152 and less or equal to 1728. The downsample factor is set equal to two (1) if the number of pixels per line is greater than 720, or (2) if the number of lines per frame is greater than 576. If the above described conditions are not met, then the video image is an SD video image and no downsampling is required. In that case the downsample factor is set equal to one. It is anticipated that a video image that is larger than 2160 pixels by 1728 pixels will require a downsampling factor of four. At the present time the largest size video image known to be in use is 1920 pixels by 1080 pixels.

After the downsizing process is completed, an SD size video image is generated and sent to field and line rate converter 130 for motion estimation. Field and line rate converter 130 generates motion vectors for the down-sampled SD size video images. The SAA4992 integrated circuit of field and line rate converter 130 supports a motion vector overlay mode. That is, the motion vectors generated by field and line rate converter 130 are overlayed on the video images as color data. This feature permits the motion vectors to be read directly from field and line rate converter 130. That is, no additional hardware or software functionality is needed to obtain the motion vectors.

After the SD motion vectors are obtained, they are sent to motion vector post processing unit 170. The SD motion vectors are scaled to HD velocity (i.e., magnitude) in motion vector post processing unit 170. As will be explained more fully, the scaled HD motion vectors are then used to generate motion compensated interlaced HD fields from HD progressive frames.

The SAA4992 integrated circuit of field and line rate converter 130 functions as a high quality motion estimator. Because the SAA4992 integrated circuit of field and line rate converter 130 uses one frame and one field to perform motion estimation, the same technique of using one frame and one field must be used for motion compensation.

Figure 2:
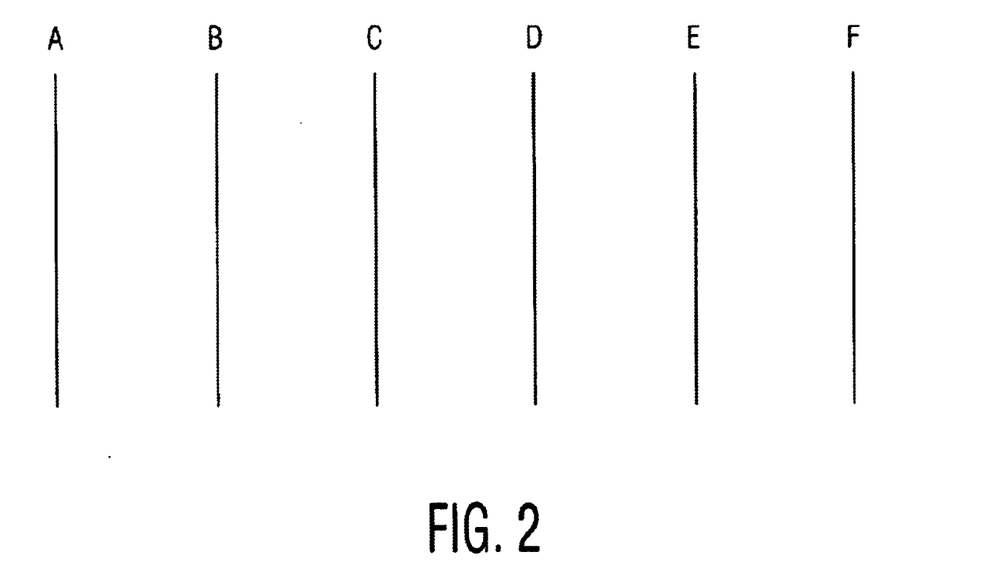
FIG. 2 illustrates a series of input progressive frames of a video signal.

As shown in FIG. 2, the input consists of the progressive frames A, B, C, D, E and F. As previously mentioned, each frame consists of an odd field and an even field. For example, frame "A" consists of an odd field "Ao" and an even field "Ae." Similarly, frame "B" consists of an odd field "Bo" and an even field "Be." Similar odd and even fields exist for the other input frames. The term "progressive" as applied to the input frames (A, B, C, D, E and F) means that the odd field and the even field of each frame are taken at the same time and combined together to form their respective frame.

Figure 3:
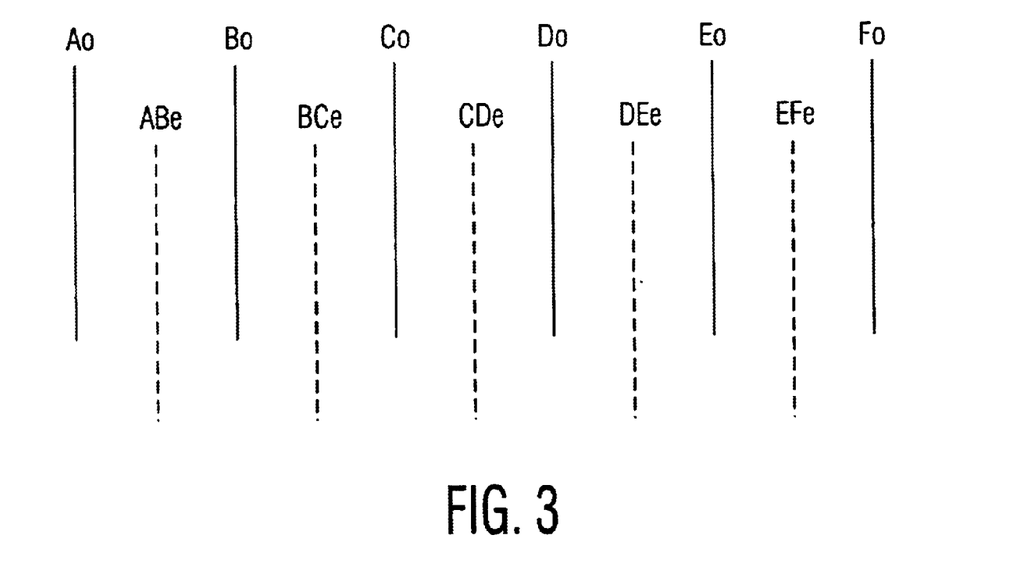
FIG. 3 illustrates a series of output interlace fields of a video signal.

As shown in FIG. 3, the output video signals are interlaced in format. The output odd field "Ao" is taken from input frame "A." The output even field "ABe" is obtained by performing motion compensation on frame "A" and on odd field "Bo" of the input sequence. In a similar manner, the output odd field "Bo" is taken from input frame "B." The output even field "BCe" is obtained by performing motion compensation on frame "B" and on odd field "Co" of the input sequence. The remaining interlaced output video signals shown in FIG. 3 are similarly obtained. In this manner the temporally missing fields are generated by using (1) the previous frame, and (2) the next frame, and (3) the motion vectors.

The motion vectors from field and line rate converter 130 are scaled in accordance with the downsample factor (DSF) that was applied to the HD input in pre-filter and downsampler unit 150. For example, assume that mvx (i,j) and mvy (i,j) are the motion vectors in the x and y direcdtions, respectively, that are obtained from field and line rate converter 130. Then the HD motion vectors generated in motion vector post processing unit 170 will be:

$$mvxHD\ [(DSF)i, (DSF)j] = (DSF)\ mvx(i,j) \quad (1)$$

$$mvxHD\ [(DSF)i, (DSF)j] = (DSF)\ mvx(i,j) \quad (2)$$

It is seen that not only is the velocity (i,e., magnitude) of the motion vectors scaled, but also the position of the motion vectors. This means that, if in an SD video image, the motion vector was applicable to a block of two by two (2×2), in HD it will be applicable to a block of (DSF times 2) by (DSF times 2). In other words, it will be applicable to a block of (2 DSF) by (2 DSF). Therefore, if the downsample factor is two (DSF=2), then the motion vector for a two by two block (2×2) in SD is applicable to a four by four block (4×4) in HD. This scaling causes a loss in the accuracy of the motion vector.

The motion vectors that are obtained from field and line rate converter 130 are accurate to one fourth (0.25) of a pixel. If the motion vectors are scaled by a factor of two (2), then it is to be expected that the motion vectors will only be accurate to one half (0.50) of a pixel. This is because two times one fourth is equal to one half ( 2×0.25=0.50). Unfortunately, this expectation is not met because it turns out that the motion vectors are not accurate to one half (0.50) of a pixel. This is due to the fact that the filtering and downsampling of the HD input performed in pre-filter and downsampler unit 150 causes smoothing of the picture and smoothing of the object motion. The half pixel accuracy can not be reliably achieved due to the smoothing introduced during the filtering and downsampling process.

This means that it is not possible to achieve an accuracy of one fourth (0.25) of a pixel by performing simple calculations on the neighboring pixels that surround the pixel in question. It also means that the scaled motion vectors may not be very reliable, especially at the edges of the video image.

Given a frame, a field, and the associated motion vectors, the task is to upconvert the information into an HD signal while minimizing distortions and inaccuracies in the video signal. One prior art approach is to average the motion compensated pixels from the frame and the field. This method works reasonably well if the motion vectors are accurate. If the motion vectors are not accurate, however, the averaging of the pixels from the frame and the field will produce blurring of the picture, which can be very noticeable in slow moving areas of the video image.

The improved method of the present invention uses a different approach. The HD motion vectors from motion vector post processing unit 170 are sent to HD upconversion unit 180. As shown in FIG. 1, HD upconversion unit 180 is also connected to HD input 120 and receives the input HD video signal from HD input 120. HD upconversion unit 180 than has the following data: (1) the motion vectors from the SD video image appropriately scaled, and (2) the HD frame, and (3) the HD field, and (4) the causal region of the motion compensated field. The causal region is a region of the motion compensated field that is made up of pixels whose motion compensated values have already been calculated.

As previously indicated, the values of the motion vectors are good in the global sense but they are not accurate to one half (0.50) of a pixel. The motion vectors may only be accurate to one or two pixels. This means that when the prior art averaging method is used, the edges will exhibit blurring. The improved method of the present invention avoids blurring the video image by not averaging the frame motion compensated pixel with the field motion compensated pixel. Instead, the improved method of the present invention selects and uses either the frame motion compensated pixel or the field motion compensated pixel. The improved method of the present invention for determining which pixel to select and use will now be described.

Figure 4:
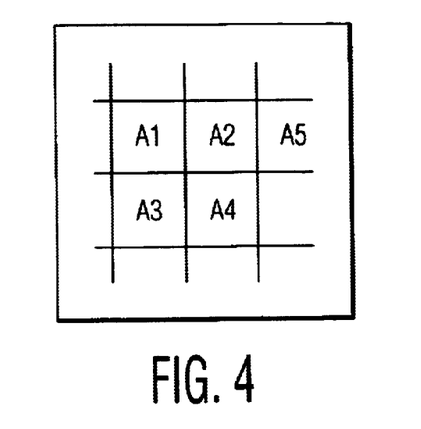
FIG. 4 illustrates a previous frame A of a video signal showing five pixels for display at time T.
Figure 5:
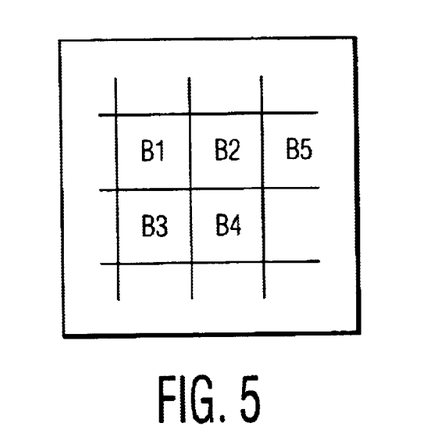
FIG. 5 illustrates a next field B of a video signal showing a corresponding set of five pixels for display at time T+1.
Figure 6:
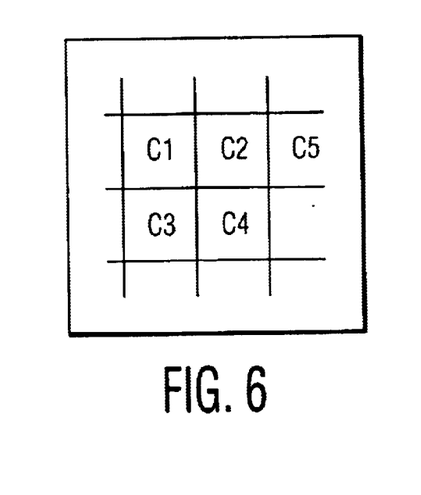
FIG. 6 illustrates a generated field C of a video signal showing a corresponding set of five pixels generated by motion compensation for display at intermediate time T+½.

The method will be illustrated with an example using the three figures shown in FIG. 4, FIG. 5 and FIG. 6. FIG. 4 shows a previous frame A of a video signal showing five pixels (A1, A2, A3, A4 and A5) for display at time T. FIG. 5 shows a next field B of a video signal showing a corresponding set of five pixels (B1, B2, B3, B4 and B5) for display at time T+1. The unit "1" in the expression "T+1" represents one unit of time between previous frame A and next field B. FIG. 6 shows a generated field C of a video signal showing a corresponding set of five pixels (C1, C2, C3, C4 and C5) generated by motion compensation for display at intermediate time T+½ between previous frame A and next field B. The unit "½" in the expression "T+½" represents one half unit of time between previous frame A and generated field C.

Consider pixel C4 in generated field C. The task is to find and generate the appropriate value for this pixel. Pixel A4 in previous frame A is the motion compensated pixel in previous frame A that corresponds to pixel C4. Pixel B4 in next field B is the motion compensated pixel in next field B that corresponds to pixel C4. The prior art averaging method adds the value of pixel A4 to the value of pixel B4 and divides the sum of the values by two to obtain the value of pixel C4.

The improved method of the present invention, in contrast, selects either the value of the frame motion compensated pixel (pixel A4) or the value of the field motion compensated pixel (pixel B4) for the value of the generated field pixel (pixel C4). The selection of pixel A4 or pixel B4 is made by considering the values of the causal neighbors of pixel C4. Causal neighbors are neighboring pixels whose values have already been calculated. In the present example, the causal neighbors of pixel C4 are the pixels C1, C2, C3 and C5.

If the causal neighbors of pixel C4 match the corresponding neighbors of pixel A4 to within a certain threshold value, the value of pixel A4 is selected for the value of pixel C4. If the causal neighbors of pixel C4 do not match the corresponding neighbors of pixel A4 to within the threshold value, then the corresponding neighbors of pixel B4 are considered. If the causal neighbors of pixel C4 match the corresponding neighbors of pixel B4 to within a certain threshold value, the value of pixel B4 is selected for the value of pixel C4.

An appropriate-threshold value may be chosen using the fact that a pixel value difference of ten or less between adjacent pixels is not too noticeable a difference. The threshold value may be chosen to have a value of ten times the number of causal neighbors being considered at one time. In the present example, four causal neighbors (C1, C2, C3 and C5) are being considered at one time. Therefore, the threshold value may be chosen to have the value forty.

The matching of the causal neighbors of pixel C4 with the corresponding neighbors of pixel A4 is carried out by adding the absolute values of the differences of the values of the causal neighbors in generated field C and the values of the corresponding neighbors in previous frame A. A value called "ACOR" (representing the correlation of causal neighbors in generated field C and corresponding neighbors in previous frame A) is calculated as follows:

$$ACOR = ABS(A1-C1) + ABS(A2-C2) + ABS(A3-C3) + ABS(A5-C5) \quad (3)$$

where the letters ABS represent the mathematical function of taking the absolute value.

Similarly, a value called "BCOR" (representing the correlation of causal neighbors in generated field C and corresponding neighbors in next field B) is calculated as follows:

$$BCOR = ABS(B1-C1) + ABS(B2-C2) + ABS(B3-C3) + ABS(B5-C5) \quad (4)$$

where the letters ABS again represent the mathematical function of taking the absolute value.

If the value of ACOR is less than the threshold value, then the value of pixel C4 is chosen to be the value of pixel A4. If the value of ACOR is equal to or greater than the threshold value, then the value of BCOR is considered. If the value of BCOR is less than the threshold value, then the value of pixel C4 is chosen to be the value of pixel B4.

If the value of BCOR is equal to or greater than the threshold value, then another motion compensation method may be used to obtain the value of pixel C4. For example, motion compensation techniques using block-based motion vectors may be used. As a last resort, if no other method can be found that can determine whether pixel A4 or pixel B4 is the appropriate pixel value for pixel C4, then the prior art averaging method may be used to obtain a pixel value for pixel C4.

The use of the causal neighbors from generated field C (i.e., pixels C1, C2, C3 and C5) that are already motion compensated helps to verify that the pixels that are being used are from the correct frame or field. The pixel values provided by the improved method of the present invention eliminate much of the blurring of the video image that results from the prior art averaging method. The pixel values provided by the improved method of the present invention give a sharply defined motion compensated video image. In cases where the pixel to be selected is located in an area of the video image that is being covered (or that is being uncovered) during video image motion, the pixel values provided by the improved method of the present invention help select the better pixel of the two pixels choices. This improves the video image quality of covered (and uncovered) regions of the video image.

HD upconversion unit 180 performs the improved method of the present invention to select the appropriate pixels to make up generated field C. Generated field C is then interpolated (at time T+½) between previous frame A (at time T) and next field B (at time T+1). The interpolation process is repeatedly applied to create appropriate output interlace fields ABe, BCe, CDe, DEe and EFe shown in FIG. 3. The output of HD upconversion unit 180 is sent to HD output 190.

Figure 7:
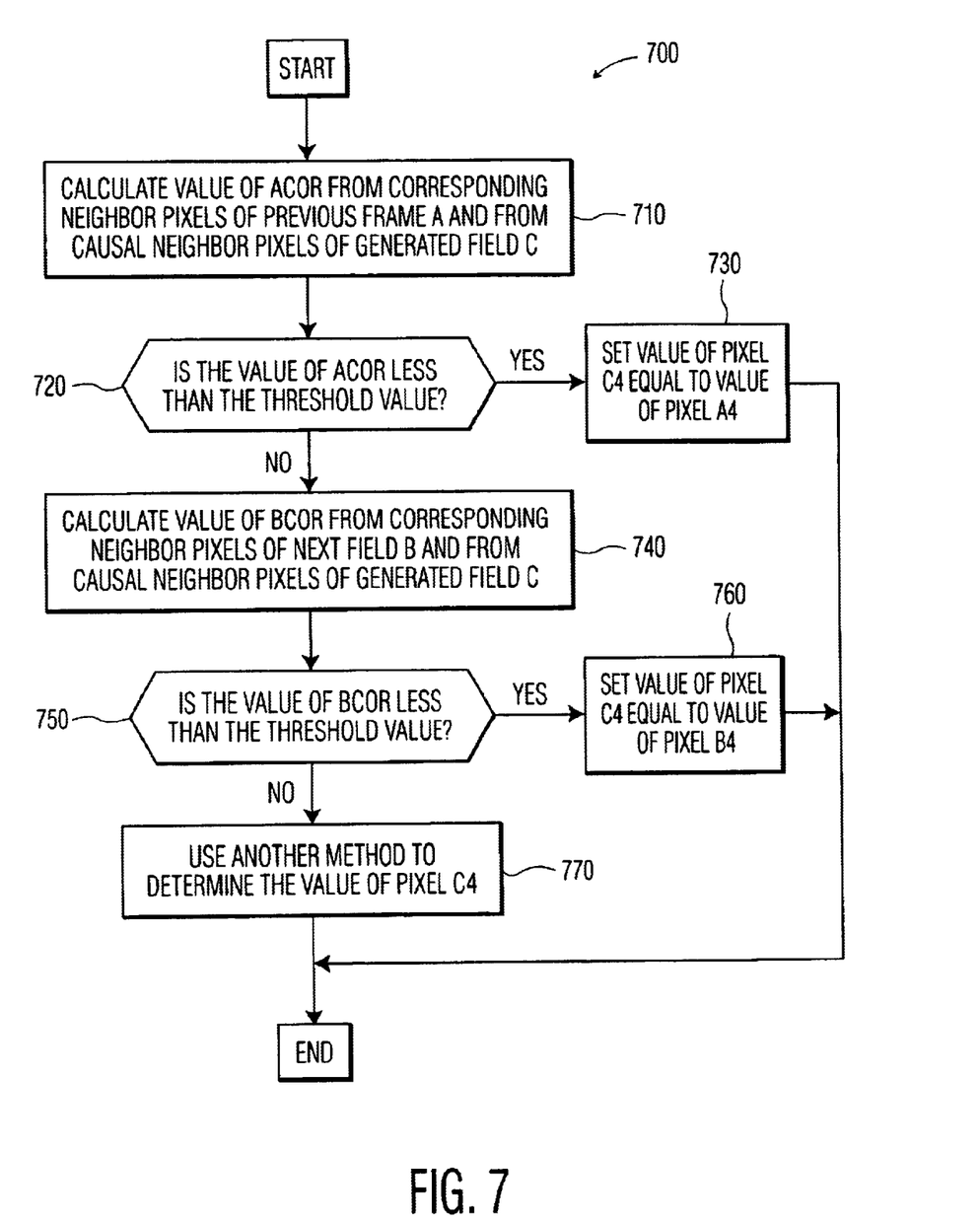
FIG. 7 is a flow diagram illustrating the improved method of the present invention.

FIG. 7 is a flow diagram illustrating the improved method of the present invention. The steps of the improved method are collectively referred to with reference number 700. In the first step the ACOR value (representing the correlation of causal neighbors in generated field C and corresponding neighbors of previous frame A) is calculated by adding the absolute values of the differences of the values of the causal neighbors in generated field C and the values of the corresponding neighbors in previous frame A (step 710). Then a determination is made whether the ACOR value is less than the threshold value (decision step 720). If the ACOR value is less than the threshold value, then the value of pixel C4 is set equal to the value of pixel A4 (step 730). After the value of pixel C4 is set in step 730, the method terminates its operation (end step).

If the ACOR value is not less than the threshold value, then the BCOR value (representing the correlation of causal neighbors in generated field C and corresponding neighbors in next field B) is calculated by adding the absolute values of the differences of the values of the causal neighbors in generated field C and the values of the corresponding neighbors in next field B (step 740). Then a determination is made whether the BCOR value is less than the threshold value (decision step 750). If the BCOR value is less than the threshold value, then the value of pixel C4 is set equal to the value of pixel B4 (step 760). After the value of pixel C4 is set in step 760, the method terminates its operation (end step).

If the BCOR value is not less than the threshold value, then another method may be used to determine the value of pixel C4 (step 770). After the value of pixel C4 is set in step 770, the method terminates its operation (end step).

Although the present invention has been described in detail with respect to the illustrative example of a high definition (HD) progressive to interlace converter, those skilled in the art should understand that they can make various changes, substitutions and alterations herein without departing from the spirit and scope of the invention in its broadest form.

What is claimed is:

1. For use in a video image upconversion unit of the type that uses motion compensation to generate an interpolated field using motion vectors, a method of motion compensation comprising the steps of:
   calculating a correlation value from the values of causal neighbor pixels of a generated field and from the values of corresponding neighbor pixels of a previous frame;
   comparing said correlation value with a threshold value; and
   setting the value of a pixel to be created within said generated field to be equal to the value of a corresponding pixel of said previous frame if said correlation value is less than said threshold value.

2. The method as claimed in claim 1 wherein the step of calculating a correlation value from the values of causal neighbor pixels of a generated field and from the values of corresponding neighbor pixels of a previous frame comprises the step of:
   adding the absolute values of the differences between the value of each causal neighbor pixel of said generated field and the value of each corresponding neighbor pixel of said previous frame.

3. The method as claimed in claim 1 wherein said threshold value has a value equal to ten times the number of causal neighbor pixels used to calculate said correlation value.

4. For use in a video image upconversion unit of the type that uses motion compensation to generate an interpolated field using motion vectors, a method of motion compensation comprising the steps of:
   calculating a correlation value from the values of causal neighbor pixels of a generated field and from the values of corresponding neighbor pixels of a next field;
   comparing said correlation value with a threshold value; and
   setting the value of a pixel to be created within said generated field to be equal to the value of a corresponding pixel of said next field if said correlation value is less than said threshold value.

5. The method as claimed in claim 4 wherein the step of calculating a correlation value from the values of causal neighbor pixels of a generated field and from the values of corresponding neighbor pixels of a next field comprises the step of:
   adding the absolute values of the differences between the value of each causal neighbor pixel of said generated field and the value of each corresponding neighbor pixel of said next field.

6. The method as claimed in claim 4 wherein said threshold value has a value equal to ten times the number of causal neighbor pixels used to calculate said correlation value.

7. For use in a video image upconversion unit of the type that uses motion compensation to generate an interpolated field using motion vectors, a method of motion compensation comprising the steps of:
   calculating a first correlation value from the values of causal neighbor pixels of a generated field and from the values of corresponding neighbor pixels of a previous frame;
   calculating a second correlation value from the values of causal neighbor pixels of said generated field and from the values of corresponding neighbor pixels of a next field;
   comparing said first correlation value with a first threshold value;
   setting the value of a pixel to be created within said generated field to be equal to the value of a corresponding pixel of said previous frame if said first correlation value is less than said first threshold value;
   comparing said second correlation value with a second threshold value; and
   setting the value of said pixel to be created within said generated field to be equal to the value of a corresponding pixel of said next field if said second correlation value is less than said second threshold value.

8. The method as claimed in claim 7 wherein the step of calculating a first correlation value from the values of causal neighbor pixels of a generated field and from the values of corresponding neighbor pixels of a previous frame comprises the step of:
   adding the absolute values of the differences between the value of each causal neighbor pixel of said generated field and the value of each corresponding neighbor pixel of said previous frame.

9. The method as claimed in claim 7 wherein the step of calculating a second correlation value from the values of causal neighbor pixels of said generated field and from the values of corresponding neighbor pixels of a next field comprises the step of:
   adding the absolute values of the differences between the value of each causal neighbor pixel of said generated field and the value of each corresponding neighbor pixel of said next field.

10. The method as claimed in claim 7 wherein said first threshold value has a value equal to ten times the number of causal neighbor pixels used to calculate said first correlation value.

11. The method as claimed in claim 7 wherein said second threshold value has a value equal to ten times the number of causal neighbor pixels used to calculate said second correlation value.

12. For use in a video image upconversion unit of the type that uses motion compensation to generate an interpolated field using motion vectors, a method of motion compensation comprising the steps of:
 obtaining the values of corresponding neighbor pixels of a previous frame that correspond to the causal neighbor pixels of a generated field that relate to a pixel to be created within said generated field;
 obtaining the values of causal neighbor pixels of said generated field that relate to said pixel to be created within said generated field;
 calculating a first correlation value from the values of said causal neighbor pixels of said generated field and from the values of said corresponding neighbor pixels of said previous frame;
 comparing said first correlation value with a first threshold value; and
 setting the value of said pixel to be created within said generated field to be equal to the value of a corresponding pixel of said previous frame if said first correlation value is less than said first threshold value.

13. The method as claimed in claim 12 wherein the step of calculating a first correlation value from the values of said causal neighbor pixels of said generated field and from the values of said corresponding neighbor pixels of said previous frame comprises the step of:
 adding the absolute values of the differences between the value of each causal neighbor pixel of said generated field and the value of each corresponding neighbor pixel of said previous frame.

14. The method as claimed in claim 12 wherein said first threshold value has a value equal to ten times the number of causal neighbor pixels used to calculate said first correlation value.

15. The method as claimed in claim 12 further comprising the steps of:
 obtaining the values of corresponding neighbor pixels of a next field that correspond to the causal neighbor pixels of a generated field that relate to a pixel to be created within said generated field;
 obtaining the values of causal neighbor pixels of said generated field that relate to said pixel to be created within said generated field;
 calculating a second correlation value from the values of said causal neighbor pixels of said generated field and from the values of said corresponding neighbor pixels of said next field;
 comparing said second correlation value with a second threshold value; and
 setting the value of said pixel to be created within said generated field to be equal to the value of a corresponding pixel of said next field if said second correlation value is less than said second threshold value.

16. The method as claimed in claim 15 wherein the step of calculating a second correlation value from the values of said causal neighbor pixels of said generated field and from the values of said corresponding neighbor pixels of said next field comprises the step of:
 adding the absolute values of the differences between the value of each causal neighbor pixel of said generated field and the value of each corresponding neighbor pixel of said next field.

17. The method as claimed in claim 15 wherein said second threshold value has a value equal to ten times the number of causal neighbor pixels used to calculate said second correlation value.

18. The method as claimed in claim 15 further comprising the step of:
 setting the value of said pixel to be created within said generated field to be equal to the average of the value of a corresponding pixel of said previous frame and the value of a corresponding pixel of said next field if said first correlation value is not less than said first threshold value and if said second correlation value is not less than said second threshold value.

19. A high definition progressive to interlace converter comprising a high definition video image upconversion unit that uses motion compensation to generate an interpolated field using motion vectors, wherein said high definition video image upconversion unit is capable of:
 calculating a first correlation value from the values of causal neighbor pixels of a generated field and from the values of corresponding neighbor pixels of a previous frame;
 comparing said first correlation value with a first threshold value; and
 setting the value of a pixel to be created within said generated field to be equal to the value of a corresponding pixel of said previous frame if said first correlation value is less than said first threshold value.

20. The high definition progressive to interlace converter as claimed in claim 19 wherein said high definition video image upconversion unit is capable of:
 calculating a second correlation value from the values of causal neighbor pixels of said generated field and from the values of corresponding neighbor pixels of a next field;
 comparing said second correlation value with a second threshold value; and
 setting the value of a pixel to be created within said generated field to be equal to the value of a corresponding pixel of said next field if said second correlation value is less than said second threshold value.

21. The high definition progressive to interlace converter as claimed in claim 20 wherein said high definition video image upconversion unit is capable of:
 calculating said first correlation value by adding the absolute values of the differences between the value of each causal neighbor pixel of said generated field and the value of each corresponding neighbor pixel of said previous frame; and
 calculating said second correlation value by adding the absolute values of the differences between the value of each causal neighbor pixel of said generated field and the value of each corresponding neighbor pixel of said next field.

22. The high definition progressive to interlace converter as claimed in claim 20 wherein:
 said first threshold value has a value equal to ten times the number of causal neighbor pixels used to calculate said first correlation value; and wherein
 said second threshold value has a value equal to ten times the number of causal neighbor pixels used to calculate said second correlation value.

23. The high definition progressive to interlace converter as claimed in claim 20 wherein said high definition video image upconversion unit is capable of:

setting the value of said pixel to be created within said generated field to be equal to the average of the value of a corresponding pixel of said previous frame and the value of a corresponding pixel of said next field if said first correlation value is not less than said first threshold value and if said second correlation value is not less than said second threshold value.

24. A high definition receiver comprising a high definition progressive to interlace converter comprising a high definition video image upconversion unit that uses motion compensation to generate an interpolated field using motion vectors, wherein said high definition video image upconversion unit is capable of:

calculating a first correlation value from the values of causal neighbor pixels of a generated field and from the values of corresponding neighbor pixels of a previous frame;

comparing said first correlation value with a first threshold value; and setting the value of a pixel to be created within said generated field to be equal to the value of a corresponding pixel of said previous frame if said first correlation value is less than said first threshold value.

25. The high definition receiver as claimed in claim 24 wherein said high definition video image upconversion unit is capable of:

calculating a second correlation value from the values of causal neighbor pixels of said generated field and from the values of corresponding neighbor pixels of a next field;

comparing said second correlation value with a second threshold value; and setting the value of a pixel to be created within said generated field to be equal to the value of a corresponding pixel of said next field if said second correlation value is less than said second threshold value.

26. The high definition receiver as claimed in claim 25 wherein said high definition video image upconversion unit is capable of:

calculating said first correlation value by adding the absolute values of the differences between the value of each causal neighbor pixel of said generated field and the value of each corresponding neighbor pixel of said previous frame; and calculating said second correlation value by adding the absolute values of the differences between the value of each causal neighbor pixel of said generated field and the value of each corresponding neighbor pixel of said next field.

27. The high definition receiver as claimed in claim 25 wherein:

said first threshold value has a value equal to ten times the number of causal neighbor pixels used to calculate said first correlation value; and wherein said second threshold value has a value equal to ten times the number of causal neighbor pixels used to calculate said second correlation value.

28. The high definition receiver as claimed in claim 20 wherein said high definition video image upconversion unit is capable of:

setting the value of said pixel to be created within said generated field to be equal to the average of the value of a corresponding pixel of said previous frame and the value of a corresponding pixel of said next field if said first correlation value is not less than said first threshold value and if said second correlation value is not less than said second threshold value.

29. A signal comprising:

an output signal of a high definition progressive to interlace converter comprising a high definition video image upconversion unit that uses motion compensation to generate an interpolated field using motion vectors, wherein said high definition video image upconversion unit generates said output signal by:

calculating a first correlation value from the values of causal neighbor pixels of a generated field and from the values of corresponding neighbor pixels of a previous frame;

comparing said first correlation value with a first threshold value; and setting the value of a pixel to be created within said generated field to be equal to the value of a corresponding pixel of said previous frame if said first correlation value is less than said first threshold value.

30. The signal as claimed in claim 29 wherein said high definition video image upconversion unit generates said output signal by:

calculating a second correlation value from the values of causal neighbor pixels of said generated field and from the values of corresponding neighbor pixels of a next field;

comparing said second correlation value with a second threshold value; and setting the value of a pixel to be created within said generated field to be equal to the value of a corresponding pixel of said next field if said second correlation value is less than said second threshold value.

31. The signal as claimed in claim 30 wherein said high definition video image upconversion unit generates said output signal by:

calculating said first correlation value by adding the absolute values of the differences between the value of each causal neighbor pixel of said generated field and the value of each corresponding neighbor pixel of said previous frame; and calculating said second correlation value by adding the absolute values of the differences between the value of each causal neighbor pixel of said generated field and the value of each corresponding neighbor pixel of said next field.

32. The signal as claimed in claim 30 wherein:

said first threshold value has a value equal to ten times the number of causal neighbor pixels used to calculate said first correlation value; and wherein said second threshold value has a value equal to ten times the number of causal neighbor pixels used to calculate said second correlation value.

33. The signal as claimed in claim 30 wherein said high definition video image upconversion unit generates said output signal by:

setting the value of said pixel to be created within said generated field to be equal to the average of the value of a corresponding pixel of said previous frame and the value of a corresponding pixel of said next field if said first correlation value is not less than said first threshold value and if said second correlation value is not less than said second threshold value.

* * * * *